United States Patent
George et al.

(10) Patent No.: US 7,838,597 B2
(45) Date of Patent: Nov. 23, 2010

(54) FLUID LOSS CONCENTRATE FOR HYDRAULIC CEMENT

(75) Inventors: Michael E. George, Flower Mound, TX (US); Kristi J. Beckman, Houston, TX (US); Freddie Lyn Sabins, Houston, TX (US); Cory J. Sikora, Peachtree City, GA (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 0 days.

(21) Appl. No.: 11/196,606

(22) Filed: Aug. 2, 2005

(65) Prior Publication Data

US 2006/0041060 A1    Feb. 23, 2006

Related U.S. Application Data

(60) Provisional application No. 60/603,206, filed on Aug. 20, 2004, provisional application No. 60/628,383, filed on Nov. 16, 2004.

(51) Int. Cl.
*C08G 63/91* (2006.01)
*C04B 24/00* (2006.01)

(52) U.S. Cl. .................. 525/56; 525/57; 524/2; 524/3; 524/557; 106/724; 106/725; 106/727; 106/823

(58) Field of Classification Search ............ 524/2, 524/3, 557; 526/303, 310, 330; 525/56, 525/57; 106/724, 725, 727, 823
See application file for complete search history.

(56) References Cited

U.S. PATENT DOCUMENTS

| | | | | |
|---|---|---|---|---|
| 4,460,627 A | * | 7/1984 | Weaver et al. | 427/212 |
| 4,532,052 A | * | 7/1985 | Weaver et al. | 507/222 |
| 4,676,317 A | * | 6/1987 | Fry et al. | 166/293 |
| 4,703,801 A | * | 11/1987 | Fry et al. | 166/293 |
| 5,105,885 A | * | 4/1992 | Bray et al. | 166/279 |
| 5,454,867 A | * | 10/1995 | Brothers et al. | 106/724 |
| 5,783,628 A | * | 7/1998 | Yada et al. | 525/59 |
| 5,866,517 A | * | 2/1999 | Carpenter et al. | 507/226 |
| 6,268,406 B1 | * | 7/2001 | Chatterji et al. | 523/130 |
| 6,818,709 B1 | * | 11/2004 | Vicari | 526/65 |
| 2005/0065272 A1 | * | 3/2005 | Vicari | 524/557 |

* cited by examiner

*Primary Examiner*—Ling-Sui Choi
*Assistant Examiner*—Michael M Bernshteyn
(74) *Attorney, Agent, or Firm*—Michael W. Ferrell

(57) ABSTRACT

A fluid loss additive for hydraulic cement, comprising a polyvinyl alcohol resin and a fluid loss ameliorating sulfonic acid-functionalized co-resin, where the polyvinyl alcohol has a characteristic viscosity in the range of about 1 to about 25 cps. The invention includes, in some embodiments, an aqueous concentrate of the PVOH resin and the sulfonic acid-functionalized co-resin, where the total resin content is in the range of about 10% to about 40% and the viscosity is less than 15,000 cps. By way of the invention it is possible to adjust hydraulic cement slurry characteristics in real time upon demand and reduce inventory by providing a concentrated aqueous fluid loss additive.

21 Claims, 6 Drawing Sheets

US 7,838,597 B2

FLUID LOSS CONCENTRATE FOR HYDRAULIC CEMENT

PRIORITY CLAIM

This application is based upon U.S. Provisional Application Ser. No. 60/603,206, filed Aug. 20, 2004, and U.S. Provisional Application No. 60/628,383, filed Nov. 16, 2004, both entitled "Method of Formulating Cement for Well Casings and Compositions Therefor," the priorities of which are hereby claimed.

TECHNICAL FIELD

The present invention relates generally to formulating cement with fluid loss additives. These types of cement compositions are used to secure a casing string in a wellbore, for example, in connection with petroleum production. Specifically provided are fluid loss additives comprising relatively low molecular weight polyvinyl alcohol resins with a sulfonic acid co-resin.

BACKGROUND OF THE INVENTION

Petroleum well cementing involves mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition, the cement aids in protecting the casing from corrosion, preventing blowouts by quickly sealing formations, protecting the casing from shock loads in drilling deeper wells, and sealing off lost circulation or thief zones.

A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore; moreover the fluid lost can damage sensitive formations. Cement fluid loss is particularly a problem in the process known as squeeze cementing.

There is a requirement, therefore, for materials which, when added to the cement formulation, reduce the loss of fluid from the slurry to porous formations.

The use of polyvinyl alcohol as a fluid loss control additive in cements used in oil field applications is known. Polyvinyl alcohol has been used unmodified, crosslinked with various additives and grafted with other moieties as exemplified in the following references.

U.S. Pat. No. 6,180,689 entitled "Fluid Loss Control Agents and Compositions for Cementing Oil Wells Comprising said Fluid Loss Control Agent" of Moulin describes a fluid loss control agent for a petroleum industry (or analogous) cement slurry, comprising a surfactant and a micro-gel obtained by chemical cross-linking of a polyvinyl alcohol. The micro-gel and the surfactant are compatible with petroleum industry cement additives and can also produce compositions which are gas tight. The micro-gel is obtained by reacting the polyvinyl alcohol in solution with agents which can condense with at least two alcohol functions at a pH of less than 10, the molar concentration of the cross-linking agent with respect to the monomer units of the PVOH are in the range of about 0.1% to 0.5%. The condensing agent used to synthesize the micro-gel is preferably selected from glyoxal, glutaraldehyde, maleic acid, oxalic acid, dimethylurea, polyacroleins, diisocyanates, divinylsulphate, and chlorides of diacids. Glutaraldehyde is particularly preferred. The micro-gel is typically prepared in aqueous solution comprising 2% to 5% (by weight), preferably on the order of 3.5% of cross-linked polyvinyl alcohol. Cellulosic polymers are sometimes provided as liquid additives; however, these systems have several drawbacks. For one, they are provided at low concentrations—less than 10%. Moreover, cellulosics tend to retard the set time of the cement and increase viscosity of the slurry. Another drawback of cellulosics is that they tend to thin as they move down hole, causing solids to settle. Cellulosic additives are also thought more expensive than necessary for wells operating at less than about 65° C. or so. Cellulosic polymers are commonly prepared in dispersions in mineral oil or heavy brine. This serves to "close" the polymer and allow for higher concentrations than would otherwise be possible. This method is practical, but not preferred, as the salt or mineral oil may adversely affect the cement properties if not sufficiently diluted or washed away.

U.S. Pat. No. 5,728,210 entitled "Composition and Method to Control Cement Slurry Loss and Viscosity" of Moran et al. and U.S. Pat. No. 5,850,880 entitled "Composition and Method to Control Cement Slurry Loss and Viscosity" of Moran et al., utilize polyvinyl alcohol as a liquid fluid loss additive for use in cementing well bores, particularly oil and gas well bores. The liquid fluid loss additive is formed from dissolving partially hydrolyzed polyvinyl alcohol in water. The polyvinyl alcohol has a molecular weight of about 200, 000. The solutions contain polyvinyl alcohol in an amount between 20 and 200 parts to 1000 parts of water. The polyvinyl alcohol is used in conjunction with a dispersing sulfonated polymer and surfactant. This combination is then adjusted to individual well conditions with chelating agent, cross-linking agent, biocides, antifoams, or combinations of these. The dispersants are polymers such as melamine sulfonate polymer, vinyl sulfonate polymer and styrene sulfonate polymer and mixtures of these. These dispersant materials are usually prepared at low pH and can be used in the acid form, or neutralized to form salts of the polymers, wherein the salt can be a Group I or Group II metal salt, or ammonium salts (common salts). The liquid solution can be used in conjunction with additional polymer dispersing agents to achieve lower viscosity cement slurries.

An aqueous gel that is formed from a polyvinyl alcohol or vinyl alcohol copolymer and a partially methylated melamine-formaldehyde resin in the presence of a pH regulating agent which provides an initial acid pH during the formulation of the gel is described in U.S. Pat. No. 5,061,387 entitled "Aqueous Gel System of Partially Methylated Melamine-Formaldehyde Resin and Polyvinyl Alcohol" of Victorius. These gel-forming compositions control the permeability of underground formations during water flooding and chemical flooding operations. These plugging techniques are also used during well workovers, for example, to plug leaks in well casings or to temporarily plug wells, in fracture treatments, to consolidate unconsolidated formations, and to correct the injection profile of a well by sealing high-permeability streaks so that flooding fluids will enter the formation in a more desirable front.

U.S. Pat. No. 5,009,269 entitled "Well Cement Fluid Loss Additive and Method" of Moran et al., relates to cementing of a casing string in a well bore, and more particularly to a fluid loss additive for addition to a cement slurry to be used in the cementing job. A fluid loss additive is provided which is effective at temperatures of up to about 95° C., has limited effect on slurry viscosity, and does not significantly retard cement setting. The additive is comprised of a partially hydrolyzed vinyl acetate polymer, calcium sulfate, a cross-linker for the polymer, and optionally a defoamer. Because of difficulties in manufacturing a PVOH with a molecular weight above about 200,000, the use of PVOH was considered limited to formation temperatures of about 50° C. This disclosure teaches that the useful temperature can be increased to about 95° C. by including cross-linking materials in the additive. In the presence of boric acid (or other cross-linker) and calcium sulfate (or other sulfates), the PVOH behaves as if it has a higher molecular weight. At temperatures much above 95° C., the cross-linked PVOH is not thermally stable.

U.S. Pat. No. 4,703,801 entitled "Method of Reducing Fluid Loss in Cement Compositions which may Contain Substantial Salt Concentrations" of Fry et al., discloses a method of reducing fluid loss in cement compositions which may contain substantial salt concentrations. The compositions are comprised of water, hydraulic cement and a fluid-loss additive comprising a graft polymer having a backbone of lignin, lignite, derivatized cellulose and various synthetic polymers such as polyvinyl alcohol, polyethylene oxide, polypropylene oxide and polyethyleneimine. The grafted pendant groups comprise homopolymers, copolymers and terpolymers of 2-acrylamido-2-methylpropane-sulfonic acid, acrylonitrile, N,N-dimethylacrylamide, acrylic acid, N,N-dialkyl-aminoethylmethacrylate and their salts. The backbone comprises from about 5 to about 95 percent by weight of the graft polymer, and the pendant groups can comprise from about 5 to about 95 percent by weight of the graft polymer.

U.S. Pat. No. 4,967,839 entitled "Method and Composition for Cementing in a Wellbore," of Carpenter et al. discloses a cement composition for oil and gas wells comprising at least 2 weight percent of tricalcium aluminate, at least 2 weight percent of gypsum, and between 0.3 to 2.0 weight percent of a polyvinyl alcohol having a degree of hydrolysis that is less than about 92 percent. According to Carpenter, polyvinyl alcohols with a molecular weight of less than 75,000 are preferred.

Additional references of interest follow. U.S. Pat. No. 6,110,270 entitled "Method for Influencing Moisture Content and Migration in Building Materials," of Beckenhauer teaches an aqueous PVOH solution for typical use as a coating on building materials in order to prevent the migration of moisture through a porous building. The solutions may contain from about 0.01% to about 30% by weight of PVOH which may have a molecular weight ranging from about 5,000 to about 500,000.

U.S. Pat. No. 6,739,806 entitled "Cement Compositions with Improved Fluid Loss Characteristics and Methods of Cementing Subterranean Formations," to Szymanski et al. discloses methods for preventing fluid loss in cement slurries by connecting two polymers via a pH sensitive crosslinking agent, such as a polyvalent cation. In preferred embodiments the additive contains a first PVOH polymer with a molecular weight of at least 80,000 and a second PVOH polymer with a molecular weight of about 8,000. The polymers are dissolved in water with a cross-linker and the pH is adjusted until the solution achieves a desired molecular weight. Likewise, U.S. Pat. No. 5,594,050 to Audebert et al. discloses a fluid loss control agent which employs chemically cross-linked PVOH.

U.S. Pat. No. 5,105,885 entitled "Well Cementing Method Using a Dispersant and Fluid Loss Intensifier," of Bray et al. discloses a fluid loss additive package containing an ethoxylate, a dispersant material and, optionally, a water soluble polymeric compound. The polymeric compound may comprise polymers such as polyvinyl alcohol or 2-acrylamido-2-methylpropyl sulfonic acid (AMPS) copolymers.

Fluid loss additives are conventionally provided in powdered form or in dilute solutions. High molecular weight additives are conventionally believed superior; however, such additives are not generally amenable to being provided in concentrated solution because viscosity becomes too high. Accordingly, conventionally fluid loss additives are supplied at concentrations less than 10 percent by weight when provided in aqueous form. This leads to large inventory requirements and high shipping costs per pound of additive since mostly water is being handled.

Alternatively, additives are provided in solid form, typically mixed with a dry cement composition which makes it difficult to adjust characteristics of the composition quickly in response to drilling requirements and leads to unnecessary additive usage and/or inferior performance. Worse, in cases where only seawater is available, such as offshore drilling installations, the additives tend to have lower solubility in seawater and may mix poorly with a seawater cement slurry.

In one aspect of the present invention, the fluid loss additives are supplied in concentrated aqueous form which enables adjustment of hydraulic cement slurry characteristics in real time in order to optimize slurry characteristics, particularly fluid loss. The additives in the concentrates of the invention are important as they are especially valuable in offshore applications where space is limited and changes need to be made quickly.

SUMMARY OF THE INVENTION

The inventive blended resin fluid loss additives exhibit remarkable fluid loss reduction in cement compositions, especially at elevated temperatures. Indeed, the performance of the blends is especially surprising in view of the fluid loss performance of individual resin components. FIG. 1 illustrates the respective fluid loss properties of an invention blend and unblended resins (API fluid loss at elevated temperatures). It will be appreciated from FIG. 1 that the PVOH sulfonic acid resin blends exhibit fluid loss reductions in cement of almost an order of magnitude with respect to NNDMA/AMPS copolymer and about 5-fold with respect to PVOH alone. In FIG. 1, the NNDMA/AMPS values are taken from Examples 20 and 22, below. The PVOH values are taken from Examples 7 and 13-15. The values for PVOH+AMPS co-resin is taken from examples 45 and 46. Each of the examples has a similar total resin content (including dispersant). Various aspects of the invention are summarized below and described in detail thereafter.

There is provided in accordance with the present invention an aqueous concentrate for hydraulic cement comprising a polyvinyl alcohol resin (PVOH) with a characteristic viscosity of from about 1 cps to about 25 cps and a fluid loss ameliorating co-resin selected from sulfonic acid-functionalized resins. The concentrate has a total resin content in the range of about 10 to 40 percent and has a viscosity of from about 10 cps to about 15,000 cps at 20° C. Typically the sulfonic acid functionalized co-resin comprises AMPS monomers. If present as a copolymer, the co-resin generally includes predominantly, i.e., over 50 mole percent, sulfonic acid-functionalized monomers, such as AMPS. In preferred embodiments the co-resin is a copolymer of AMPS and N,N-dimethylacrylamide (NNDMA), where the copolymer typically has from about 60 to about 99 weight percent AMPS units and from about 1 to 40 weight percent NNDMA units.

The polyvinyl alcohol resin may also have a characteristic viscosity in the range of from about 2 cps to 15 cps, and preferably from about 3 cps to about 10 cps, or even from about 5 cps to about 7 cps. The polyvinyl alcohol may be hydrolyzed in an amount from about 80 to 95 percent based on the polyvinyl acetate monomer, and is typically hydrolyzed in amounts ranging from about 84 percent to about 90 percent or, even more preferably, from about 87 percent to about 89 percent. The PVOH resin is generally derived from polyvinyl acetate homopolymers, although comonomers may be present in minor amounts. The PVOH resin is usually, though not necessarily, provided to the aqueous concentrate in particulate form which has a size such that at least about 99% of the resin passes through an 80 mesh sieve.

The aqueous concentrate of the present invention has a suitable weight ratio of polyvinyl alcohol resin to sulfonic acid-functionalized co-resin in the range of from about 1:1 to about 20:1; preferred weight ratios of PVOH to co-resin are from about 2.5:1 to about 10:1, from about 3:1 to about 10:1, from about 4:1 to about 8:1, and from about 5:1 to 7:1. Typically, the polyvinyl alcohol and the co-resin are substantially fully dissolved in the aqueous concentrate.

Advantageously, the concentrate in the present invention has a high resin content at a relatively low viscosity. Generally, the concentrate has a total resin content of about 15 to 30 weight percent, and more typically from about 15 to about 25 weight percent. The concentrate may have a viscosity in the following ranges: from about 100 to about 12,000 cps, from about 500 to about 10,000 cps, or from about 1,000 to about 8,000 cps at 20° C. In some embodiments the aqueous concentrate may contain a biocide.

In another aspect of the present invention there is provided a resin blend as a fluid loss additive comprising a PVOH resin with a characteristic viscosity of from about 1 to about 25 cps and a fluid loss ameliorating co-resin selected from sulfonic acid functionalized resins, where the PVOH is present in the blend in an amount of at least three times the amount of functionalized co-resin (by weight) and where the blend is effective to impart an API fluid loss of less than about 50 ml/30 min, preferably less than about 30 ml/min, at 170° F. and 1,000 psi to a standard seawater cement slurry when present therein in amounts of less than 1.5% bwoc. The weight ratio of PVOH resin to sulfonic acid-functionalized co-resin is desirably in the ranges of from about 3:1 to 20:1, from about 3:1 to about 10:1, from about 4:1 to about 10:1, from about 4:1 to about 8:1, or from about 5:1 to about 7:1.

There is also provided for in the present invention a hydraulic cement slurry comprising water, cement, from about 0.25% bwoc to about 5.0% bwoc of PVOH resin with a characteristic viscosity of between 1 and 25 cps, and from about 0.025% bwoc to about 1.0% bwoc of a fluid loss ameliorating co-resin selected from sulfonic acid-functionalized resins. There may also optionally be present from about 0.01% bwoc to about 0.4% bwoc of a retarder or from about 0.05% bwoc to about 0.4% bwoc of an extender. The slurry should exhibit an API fluid loss of less than about 50 ml/30 min at 170° F. and 1,000 psi. The co-resin may also suitably be present in amounts ranging from 0.05% bwoc to about 0.5% bwoc, and is preferably present in amounts of from about 0.10% bwoc to about 0.35% bwoc. Desirably, the PVOH is present in amounts of from about 0.75% bwoc to about 2.0% bwoc.

In preferred embodiments the cement slurry also contains from about 0.25 to 3.0% bwoc of a dispersant. The dispersant may be any one of the following compounds: calcium lignosulfonates, beta naphthalene sulfonates, sulfonated melamine formaldehyde condensates, polyaspartates, or sodium naphthalene sulfonate formaldehyde condensate resins or mixtures thereof, where sodium sulfonate formaldehyde condensate resins are preferred. If a dispersant is present, the slurry typically has a dispersant to PVOH weight ratio of from about 0.5:1 to 3.5:1, or from about 0.5:1 to about 1.5:1.

The slurry of the present invention exhibits a reduced fluid loss over a wide range of temperatures. Preferably the slurry exhibits an API fluid loss of less than about 30 ml/min at 170° F. and 1,000 psi. At 110° F. the slurry typically exhibits an API fluid loss than about 25 ml/30 min, or even less than about 15 ml/30 min.

The slurry generally has a plastic viscosity of less than about 250 cps at 110° F., and more typically, the plastic viscosity is in the range of about 50 cps to about 200 cps at 110° F. The slurry has a yield point in an acceptable range of from about 0 to about 16 lbs per 100 square feet at 110° F., and preferably in the range of from about 0 to about 12 lbs per 100 square feet at 110° F. Typical free water values for the cement slurry are less than about 10% at 170° F., and more particularly, less than about 4% at 170° F.

The water in the slurry may be supplied from de-ioinized water or freshwater. The water in the slurry may also be seawater, as is useful in offshore cementing applications. Alternatively, the water may be brine. There is also contemplated cement which is formed from the dried slurry of the present invention.

There is further provided for in the present invention an improvement on a method of making a hydraulic cement slurry, comprising the steps of preparing a cement slurry, providing an aqueous concentrate, and combining the aqueous concentrate with the cement slurry. The aqueous concentrate comprises from about 70 to 85 weight percent water and from about 15 to 30 percent by weight of a polymeric fluid loss composition which is substantially fully dissolved in the water, where the viscosity of the concentrate is less than about 12,000 cps at 20° C.

In preferred embodiments of the improved method, the cement slurry has the following properties: a plastic viscosity of less than about 200 cps at 110° F., a yield point ranging from about 0 to 16 lbs to 100 square feet at 110° F., and a free water value of less than about 4.0% at 170° F. In the inventive method, the cement may exhibit a thickening time of less than about 6 hours, preferably in the range of about 3 to about 5 hours, when measured according to a standard schedule, described below, which has a final temperature of 120° F. and a final pressure of 6,000 psi. Additionally, the cement typically reaches a compressive strength of 50 psi in less than 10 hours, and 500 psi in less than 11 hours when measured at 197° F. and 9,500 psi. The cement generally has a zero gel time in the range of 3 to 7 hours and a transition time of less than 1.5 hours when measured at 197° F. and 9,500 psi. Preferably the transition time is less than 1 hour when measured at 145° F. and 6,000 psi.

In yet another aspect of the present invention there is provided an improvement on a method of making cement slurry with reduced fluid loss, where the improvement comprises preparing the slurry, combining therewith a PVOH having a characteristic viscosity in the range of from about 1 cps to about 25 cps, and also combining therewith a co-resin selected from sulfonic acid-functionalized resins, which are added in amounts less than the PVOH resin. The slurry should exhibit an API fluid loss of less than about 50 ml/30 min at 170° F. and 1,000 psi. The fluid loss resins are typically combined with the cement slurry by addition to the cement mix water. Additional materials may also be combined with the slurry, such as cellulose derivatives. Preferred cellulose derivatives include hydroxyethyl cellulose and carboxymethylhydroxyethyl cellulose. A weighting agent, extender, or retarder may also be combined with the slurry.

In still another aspect of the present invention there is provided an improvement on a method of producing gas or oil from subterranean wells, where the improvement comprises the steps of: 1) preparing the cement slurry; 2) providing a fluid loss additive in the form of an aqueous concentrate having a total solids content ranging from 10% to 30% with a viscosity of less than about 15,000 cps, where the concentrate contains a polyvinyl alcohol resin with a sulfonic acid-functionalized co-resin, where the PVOH has a characteristic viscosity of from about 1 to about 25 cps; 3) combining the fluid loss additive with the cement slurry; and 4) cementing the casing string with the slurry. Gas or oil which are produced using the inventive method are also contemplated.

Among desirable features, the invention provides for (1) reduced fluid loss, (2) good rheology—not too hard to stir, anti-settling, lower plastic viscosities, and constant properties so that the cement can be placed and (3) little or no cement set retardation. Additionally, the aqueous concentrate of the present invention provides the following additional benefits: (1) it can be stored in an off-shore platform and mixed with cement powder on demand, (2) it eliminates the need for blending equipment on the rig, and (3) it reduces costs as compared to cellulose polymer aqueous concentrates. The various combined components provide synergy for one another as is seen in reducing the inventory required for effectively controlling operations.

Still further features and advantages of the invention are apparent from the following description.

BRIEF DESCRIPTION OF THE DRAWINGS

The invention is described in detail below with reference to the following drawings.

DETAILED DESCRIPTION OF THE INVENTION

Figure 1:
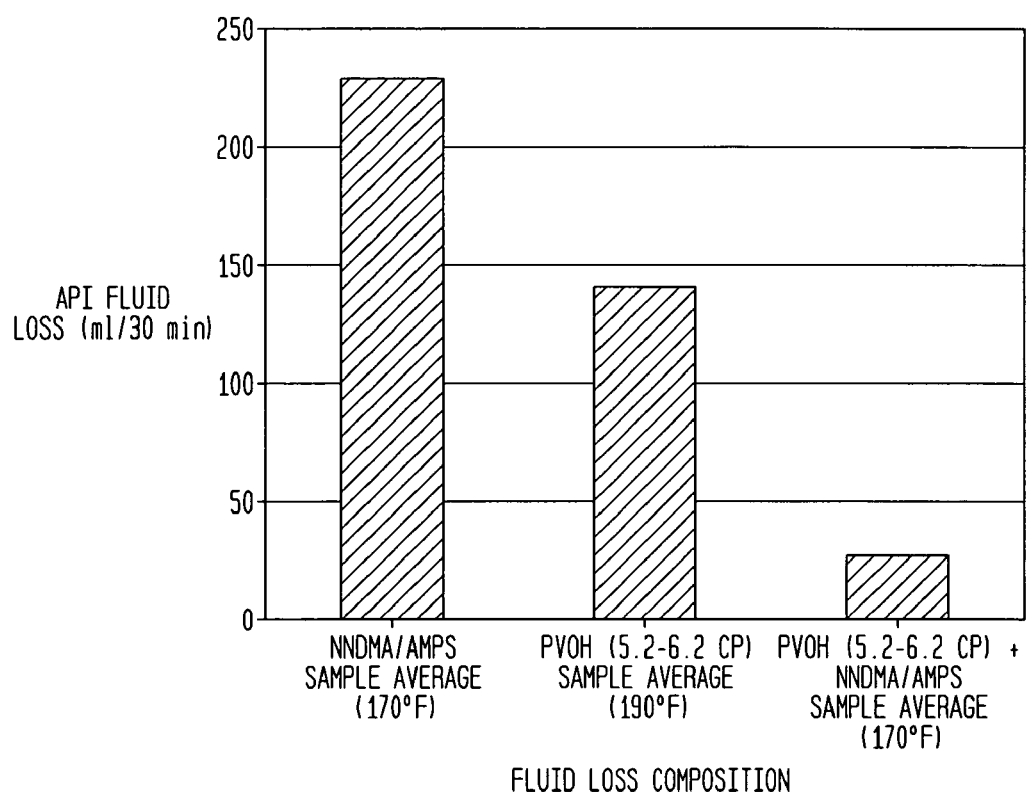
FIG. 1 is a comparison of the fluid loss properties at elevated temperatures of an invention blend composition and unblended resins.

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined, terminology as used herein is given its ordinary meaning. Percent, for example, refers to weight percent, or where the context indicates, to mole percent. "By weight of cement" (bwoc) refers to a weight of an additive in dry form as added to the cement composition based on the cement solids only.

"API fluid loss" is measured in accordance with American Petroleum Institute Specification 10 (API 10), Appendix F, July 1990 and is expressed in ml/30 minutes. The Examples below were measured at a pressure of 1,000 psi and the indicated test temperature.

"Aqueous concentrate" refers to a liquid polymeric dispersion, solution, suspension or slurry, preferably where the resin composition is at least partially dissolved, and even more preferably, where the resin composition is substantially fully dissolved.

"Biocide" and the like terminology means and includes any substance that kills or inhibits the growth of microorganisms such as bacteria, molds, slimes, fungi, etc. Biocidal chemicals include chlorinated hydrocarbons, organomettalics, halogen-releasing compounds, metallic salts, organic sulfur compounds, quaternary ammonium compounds, and phenolics. A preferred biocide is KATHON LX biocide (Rohm and Haas Corporation), the active ingredient of which is 5-chloro-methyl-4-isothiazolin-3-one. The biocide is present to prevent the aqueous concentrate from degrading due to bacterial action. Preferably, highly water soluble biocides are used.

"Characteristic viscosity" of a PVOH resin is measured in a 4% w/w aqueous solution at 20° C.

"Compressive strength" is tested according to API 10, Section 7 and Appendix D. The compressive strength is measured with an ultrasonic cement analyzer from Chandler Engineering Company LLC, (Tulsa Okla.).

"Fluid loss" or like terminology refers to any measure of water released or lost from a slurry over time.

"Free water," as used herein, refers to the aqueous phase that easily separates from a slurry under gravity separation over time. To test for free water, the cement slurry is prepared and conditioned to the test temperature. The slurry is then poured into a graduated cylinder which is placed in a water bath which is maintained at the test temperature. The free water is the amount of water, in volume percent, which separates after two hours. Free water is measured in accordance with API 10, Appendix M.

"Plastic viscosity," as used in reference to the slurry is calculated as the difference between the viscometer reading at 600 RPM ($\theta_{600}$) and the viscometer reading at 300 RPM ($\theta_{300}$). Thus, Plastic Viscosity (cps)=$\theta_{600}-\theta_{300}$. Unless otherwise indicated, the plastic viscosity is measured at the reported test temperature with a rotational viscometer consistent with the practice and procedures outlined in API 10, Appendix H.

"Set time retardation" and the like refer to a lengthening of cure time of cement due to additives.

"Standard seawater cement slurry," as used in the claims, refers to a cement slurry prepared from seawater and Class H cement where the slurry has a density of 16.2 pounds per gallon and contains 1.25% bwoc of dispersant (Lomar® D) and the specified amount of resin blend.

"Static Gel Strength" ("SGS") refers to the gel strength development characteristics of a cement slurry under the given temperature and pressure conditions. The SGS value is measured using a Static Gel Strength Analyzer (SGSA), available from the Chandler Engineering Company. The SGS value is reported in lb/100 ft$^2$.

"Sulfonic acid-functionalized resins," and like terminology, as used herein refers to a polymer having functional sulfonic acid moieties, or salts thereof. Salts of sulfonic acid co-resins may include sodium salts, potassium salts, among others. Exemplary sulfonic acid co-resins are polymers which contain AMPS or NaAMPS monomers, as are well known in the art.

"Thickening time" refers generally to the time at which the slurry undergoes a rapid rise in consistency. The thickening time is measured according to API 10, Section 8, with the proviso that, for purposes of the present invention, the reported thickening time is the time it takes for the slurry to exhibit a consistency of 70 Bearden Units (Bc). As used in the appended claims, the thickening time is measured according to the following standard schedule, where the transitions between the initial and final conditions increase linearly, and the final temperature is maintained until the end of the test:

| Condition | Time (min) | Pressure (psi) | Temperature (° F.) |
|---|---|---|---|
| Initial | 0 | 760 | 80 |
| Final | 37 | 6,000 | 120 |

"Transition time" is defined as the time required for the SGS value of the cement to increase from 100 lb/100 ft$^2$ to 500 lb/100 ft$^2$.

"Yield point," relates to the flow resistance of the cement slurry. It is calculated as follows: yield Point (lb/100 ft$^2$)=2× $\theta_{300} - \theta_{600}$. The yield point is measured at the indicated test temperature with a rotational viscometer consistent with the practice and procedures outlined in API 10, Appendix H.

"Zero gel time" is defined as the length of time from the point where the cement goes static until the SGS reaches 100 lb/100 ft$^2$.

In one aspect, the invention relates to an improved method of formulating cement compositions by way of combining a concentrate with a cement slurry. A "cement slurry" or like terminology as used herein means an aqueous composition containing solids that have hydraulic cementing properties, that is, set and harden in the presence of water. Included in such compositions may be ground granulated blast-furnace slag, other fillers, natural cement, portland cement, modified portland cement, masonry cement, hydraulic hydrated lime, and combinations of these and other materials. Specifications for Portland are set forth in ASTM specification C 150; specifications for cements that are chemically similar or analogous to Portland cement, are set forth in ASTM specifications C 11157, C 595, and C 845. A preferred cement for use in the present invention is Class H cement. The cement composition described herein may contain other additives or ingredients and should not be limited to the stated formulations.

According to the compositions and methods of the present invention, polyvinyl alcohol is used in conjunction with a co-resin to provide superior fluid loss properties to a cement slurry. Polyvinyl alcohol is a preferred fluid loss additive because it does not retard the set of cement. As used herein, "polyvinyl alcohol," "PVOH" and like terminology means polyvinyl alcohol resins which are typically prepared from polyvinyl acetate resins by saponification thereof which is well known in the art. PVOH resins are derived from homopolymers of vinyl acetate as well as copolymers of vinyl acetate with other ethylenically unsaturated monomers and may include cationic sites if so desired.

The polyvinyl alcohol resins may be based on vinyl acetate homopolymer or copolymers of vinyl acetate with any suitable comonomer and/or blends thereof. PVOH resins employed in the present invention are predominately (more than 75 mole %) based on vinyl acetate monomer which is polymerized and subsequently hydrolyzed to polyvinyl alcohol. Preferably, the resins are 95 mole percent or more vinyl acetate derived. If used, comonomers may be present from about 0.1 to 25 mole % with vinyl acetate and include acrylic comonomers such as AMPS or salts thereof. Other suitable comonomers include glycol comonomers, versatate comonomers, maleic or lactic acid comonomers, itaconic acid comonomers and so forth. Vinyl versatate including alkyl groups (veova) comonomers may likewise be useful. See Finch et al., Ed. *Polyvinyl Alcohol Developments* (Wiley 1992), pp. 84 and following. The comonomers may be grafted or co-polymerized with vinyl acetate as part of the backbone. Likewise, homopolymers may be blended with copolymers, if so desired.

In general, polyvinyl acetate in an alcohol solution can be converted to polyvinyl alcohol, i.e. —OCOCH$_3$ groups are replaced by —OH groups through "hydrolysis", also referred to as "alcoholysis". Preferred polyvinyl alcohol resins are those which are only partially hydrolyzed, representative examples appearing in Table 1 below. Most preferable are PVOH resins which are about 85 to about 90 percent hydrolyzed. The degree of hydrolysis refers to the mole % of the resin's vinyl acetate monomer content that has been hydrolyzed.

Methods of producing polyvinyl acetate-polyvinyl alcohol polymers and copolymers are known to those skilled in the art. U.S. Pat. Nos. 1,676,156; 1,971,951; and 2,109,883, as well as various literature references describe these types of polymers and their preparation. These polymers may be functionalized as is known in the art by appropriate incorporation of suitable comonomers. Among the literature references are "Vinyl Polymerization", Vol. 1, Part 1, by Ham, published by Marcel Dekker, Inc., (1967) and "Preparative Methods of Polymer Chemistry", by Sorenson and Campbell, published by Interscience Publishers, Inc., New York (1961).

Exemplary polyvinyl alcohol resins, available from Celanese, Inc. include the polymers shown below in Table 1:

TABLE 1

| Polyvinyl Alcohol Resins | | | |
|---|---|---|---|
| Grade | % Hydrolysis, | Viscosity, cps[1] | pH |
| Intermediate Hydrolyzed | | | |
| Celvol 418 | 91.0-93.0 | 14.5-19.5 | 4.5-7.0 |
| Celvol 425 | 95.5-96.5 | 27-31 | 4.5-6.5 |
| Partially Hydrolyzed | | | |
| Celvol 502 | 87.0-89.0 | 3.0-3.7 | 4.5-6.5 |
| Celvol 203 | 87.0-89.0 | 3.5-4.5 | 4.5-6.5 |
| Celvol 205 | 87.0-89.0 | 5.2-6.2 | 4.5-6.5 |
| Celvol 513 | 86.0-89.0 | 13-15 | 4.5-6.5 |
| Celvol 523 | 87.0-89.0 | 23-27 | 4.0-6.0 |
| Celvol 540 | 87.0-89.0 | 45-55 | 4.0-6.0 |

[1] 4% aqueous solution, 20° C.

Figure 2:
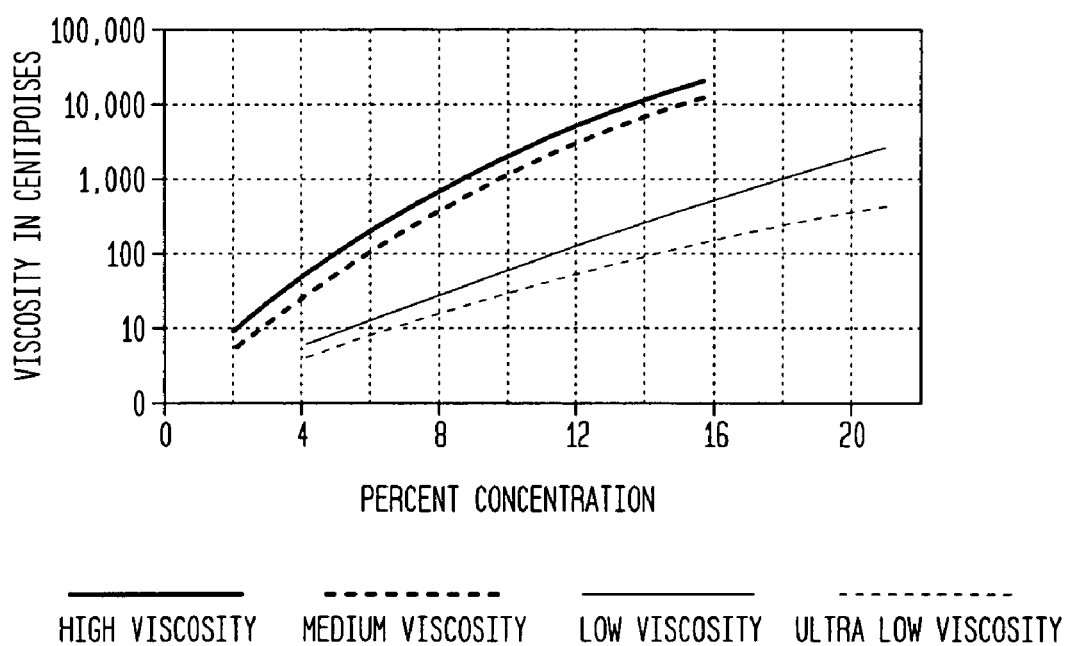
FIG. 2 is a plot of viscosity of various aqueous solutions of PVOH resins at different concentrations.

The viscosity of solutions of different PVOH resins is seen in FIG. 2. Celvol 203, 205, 523, and 540 are also available as S-grade resins which are distinguished from the standard grades because they have a fine particle size such that 99+% will pass through a U.S.S. 80-mesh screen.

When a characteristic viscosity of a polyvinyl alcohol resin is specified, the viscosity is the viscosity of a 4% aqueous (wt/wt) solution of the PVOH, at 20° C. The polyvinyl alcohol resins employed in the present invention have relatively low characteristic viscosities, ranging from about 1 cps to about 25 cps.

The PVOH employed in the present invention is used in combination with a co-resin selected from sulfonic acid-functionalized resins. As stated above, sulfonic acid-functionalized co-resin refers to polymers having sulfonic acid moieties or salts thereof. Generally, the co-resin includes the residue of an AMPS monomer, and preferably contains predominantly AMPS monomers. Repeating units of the AMPS monomer have the following structure:

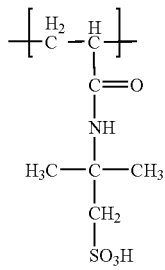

Especially preferred is a copolymer of NNDMA and AMPS, where the copolymer comprises approximately 80% by weight of AMPS, balance NNDMA.

Additional sulfonic acid-functionalized co-resins may include other acrylamide copolymers such as a copolymer of AMPS and acrylic acid. The sulfonic acid co-resin is usually present in the fluid loss composition in minor amounts, i.e., less than 50% based on the total fluid loss resin weight. Indeed, the co-resin is typically employed in much smaller amounts than the polyvinyl alcohol resin. The weight ratios of polyvinyl alcohol to the co-resin may be in a suitable range of about 2.5:1 to about 10:1, with a particularly preferred ratio being 1.25 parts of PVOH resin to 0.22 parts co-resin. The combination of the low molecular weight PVOH with the sulfonic acid co-resin achieves excellent fluid loss properties over a wide range of temperatures. This is unexpected because each resin by itself does not exhibit acceptable fluid loss prevention as is evident from the examples below. Furthermore, it is particularly surprising that the combination is effective using such small amounts of the sulfonic acid co-resin.

The resin blend of the present invention is usually substantially fully dissolved in water in the inventive aqueous concentrate. Preferably, the concentrate contains only water as a solvent, although minor amounts of other organic solvents may optionally be present. Likewise, other additives may be present in the concentrate, though preferably the concentrate consists essentially of water, the PVOH and the sulfonic acid-functionalized co-resin such that additional components do not affect the basic and novel characteristics of the invention—that is, excellent fluid loss reduction properties. The relatively low molecular weight of the PVOH used in the present invention enables the use of aqueous concentrates having a high resin content, yet a relatively low viscosity. Typically, the resin content of the concentrate ranges from about 10% to about 40% by weight and has a viscosity of less than about 15,000 cps. The relatively high solids content and low viscosity of the concentrate provides for an economical fluid loss composition with desirable rheological properties.

Cement slurries may be prepared according to conventional means as are well known in the art. The fluid loss additive compositions of the present invention are preferably combined with the cement slurry by addition to the cement mix water, but may also be added directly to the slurry or, perhaps, to the dry cement powder. The PVOH resin may be present in the slurry in a suitable amount ranging from about 0.25% bwoc to about 5.0% bwoc, and the co-resin may be present in a suitable range of from about 0.025% bwoc to 1.0% bwoc. The resins in the fluid loss composition are preferably added to the slurry together via the inventive aqueous concentrate. In other aspects of the present invention, the PVOH resin and the co-resin may be added to the cement slurry separately, and may also be added in powdered form. However, providing the fluid loss resins together as an aqueous concentrate is advantageous because it can be added to the slurry quickly, as demand may require, and disperses well in the slurry.

Other "oil field" polymers are likewise useful and can be used in the slurry in addition to the polyvinyl alcohol and sulfonic acid-functionalized resins. Suitable additional resins may include cellulose derivatives and acrylamide polymers. Exemplary oil filed polymers include acrylic polymers; polyacrylamides; PHPA—partially hydrolyzed polyacrylamides polyacrylates; cellulosic polymers; CMC—carboxymethyl cellulose; PAC—polyanionic cellulose; HPMC—hydroxypropyl methyl cellulose; starches; hydroxypropyl starches; modified starches; polyionic starch ethers; polysaccharides; carboxymethylated polymers; hydroxyalkylated polymers; hydroxypropyl guars; guar gums; diutan gums; welan gums; xanthan gums; biopolymers; polymerized fatty acids; polyglycols; polyalkylene glycols; polyglycerols; esters; polyanionic lignins and cross-linked polymers generally. Suitable polymers are enumerated in U.S. Pat. No. 4,557,763 and U.S. Pat. No. 4,626,285. The cellulose derivative use should be controlled so as not to retard setting more than is desired.

Dispersants are known to reduce the cement slurry viscosity and are preferably employed in the slurry to improve the fluid-flow characteristics. If a dispersant is used in the slurry, it may be any suitable dispersant such as calcium lignosulfonates, beta naphthalene sulfonates, sulfonated melamine formaldehyde condensates, polyaspartates, or sodium naphthalene sulfonate formaldehyde condensate resins, for example, LOMAR® D. (Cognis Inc., Cincinnati, Ohio). Additionally, polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cement compositions. Examples of polycarboxylate dispersants can be found in U.S. Pat. No. 6,267,814, U.S. Pat. No. 6,290,770, U.S. Pat. No. 6,310,143, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are incorporated herein by reference. Typically, a dispersant is used in the slurry in amounts ranging from about 0.25 to 3.0% bwoc.

Cement set time retarders may also be added to the cement slurry if it is desired to increase the thickening time of the slurry. This may be useful in situations where the operation time exceeds 2 hours and/or temperatures exceeding 150° F. are to be encountered. Any conventional retarder may be used. The above-mentioned cellulose derivatives typically act as a set-time retarder. Further examples of retarders which can be used herein include lignosulfonates, such as calcium lignosulfonate and sodium lignosulfonate, organic acids, such as citric acid, tartaric acid, gluconic acid and mixtures thereof. The amount of retarder required will vary according to the bottom hole circulating temperatures and variation in the makeup of the cement itself. A preferred set time retarder is Kelig 32, available from Borregaard LignoTech (Rothschild, Wis.).

Other additives which may be added to the slurry include weighting materials or extenders. "Weighting agent" generally refers to any additive used to increase the density of a slurry, while "extender" generally refers to additives which are used to decrease the slurry density, thereby increasing slurry yield. Suitable weighting agents include density-increasing solids such as barium sulfate, fly ash, pozzolan, hematite, ilmenite, silica, and the like. Depending on the density of the materials, certain particulate materials used as fluid loss control agents may also serve as weighting materials. See U.S. Pat. No. 4,102,400 to Crinklemeyer et al. If the density must be reduced, extender agents such as silicate compounds, preferably sodium silicate or sodium metasilicate, may be added in amounts required to reach the desired density. Other conventional extenders or silicate compounds may also be utilized. Alternatively, hollow glass beads may be used to decrease density if needed. As those skilled in the art will realize, the amount of weighting agent or extender to be employed will vary greatly depending on the material used as the additive, the desired weight of the slurry, and the like.

In addition to the above mentioned materials, cement additives that can be added include, but are not limited to: set accelerators, air-entraining agents, defoamers, anti-settling agents, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, viscosifying agents, and any other admixture or additive that does not adversely affect the properties of the admixture. Further details may be found in copending U.S. patent application Ser. No. 626,971, Publication No. 20040127606.

The slurries should have acceptable fluid loss properties at temperatures up to at least 170° F. and pressures of about 1,000 psi. The slurries may exhibit suitable API fluid loss values of less than about 100 ml/30 minutes at 170° F. and 1,000 psi. Preferably the API fluid loss value should be less than 50 ml/30 min, or even less than 30 ml/30 min. The slurries also generally exhibit free water values of less than about 10% at 170° F. Advantageously, the cement slurries prepared according to the present invention do not significantly retard the set time of the cement, as is evidenced by the thickening times. Typically, the slurries exhibit thickening times of less than 6 hours. The slurry should generally achieve a compressive strength of 500 psi in less than about 11 hours (wait-on-cement time) and should have a transition time that is preferably less than an hour and a half. Low wait-on-cement times increase productivity, as drilling cannot resume until the slurry is hardened. A short transition time is also beneficial because it minimizes gas influx. The cement slurry should also have a rheology that allows it to be easily mixed and pumped. The slurry may have a plastic viscosity of less than about 250 cps at 110° F., and the yield point may be between about 0 and 16 lbs/100 sq ft at 110° F. The cement slurries are generally prepared to have a density of from about 15 to about 18 lbs/gal and a yield of from about 0.75 to 1.5 cu-ft/sk.

Examples 1-4

For purposes of comparison, aqueous cement slurries were prepared using PVOH resin believed to have a characteristic viscosity of about 50 in a ratio of 1:2 with Lomar® D dispersant and tested for fluid loss as indicated in Table 2 below. The slurries had an initial density of about 16.4 lb/gallon.

As shown below in Table 2, below, the relatively high molecular weight resin, when used with a significant amount of dispersant, exhibits API fluid loss values of about 20 ml/30 minutes at 110° F.

TABLE 2

Examples 1-4

| Example | Temp (° F.) | PVOH (% bwoc) | Dispersant (% bwoc) | Fluid Loss (ml/min) | Fluid Loss API (ml/30 min) |
|---|---|---|---|---|---|
| 1 | 110 | 0.5 | 1.0 | 10/30 | 20 |
| 2 | 190 | 0.5 | — | 38/0.4 | 658 (calc) |
| 3 | 190 | 0.5 | 1.0 | 16/30 | 32 |
| 4 | 260 | 0.5 | 1.0 | 89/12 | 281 (calc) |

Examples 5-10

The following examples illustrate the fluid loss properties of PVOH having various characteristic viscosities.

Example 5

A quantity of 81.2 parts by weight of water was added to a mixing vessel and 18.8 parts by weight of 87-89% hydrolyzed polyvinyl alcohol powder with a characteristic viscosity of 5.2-6.2 cP was added. The mixture was heated to 85 degrees C. for sixty minutes to produce a solution of polyvinyl alcohol. From this solution 1.0% bwoc of the polyvinyl alcohol was mixed with 0.5% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 110 degrees F. and a pressure of 1000 psig for 30 minutes and the slurry was checked for plastic viscosity and yield point. The slurry exhibited an API Fluid Loss of 13 mL/30 minutes. The plastic viscosity was 81 cP and the yield point was −2 lb/100 sq.ft.

Example 6

A quantity of 88.5 parts by weight of water was added to a mixing vessel and 11.5 parts by weight of 87-89% hydrolyzed polyvinyl alcohol powder with a characteristic viscosity of 45-55 cP was added. The mixture was heated to 85 degrees C. for sixty minutes to produce a solution of polyvinyl alcohol. From this solution 1.0% bwoc of the polyvinyl alcohol was mixed with 0.5% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 110 degrees F. and a pressure of 1000 psig for 30 minutes and the slurry was checked for plastic viscosity and yield point. The slurry exhibited an API Fluid Loss of 14 mL/30 minutes. The plastic viscosity was 246 cP and the yield point was 6 lb/100 sq.ft.

Example 7

A quantity of 81.2 parts by weight of water was added to a mixing vessel and 18.8 parts by weight of 87-89% hydrolyzed polyvinyl alcohol powder with a characteristic viscosity of 5.2-6.2 cP was added. The mixture was heated to 85 degrees C. for sixty minutes to produce a solution of polyvinyl alcohol. From this solution 1.0% bwoc of the polyvinyl alcohol was mixed with 0.5% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 190 degrees F. and a pressure of 1000 psig for 30 minutes and the slurry was checked for plastic viscosity and yield point. The slurry exhibited an API Fluid Loss of 64 mL/30 minutes. The plastic viscosity was 66 cP and the yield point was 0 lb/100 sq.ft.

Example 8

A quantity of 88.5 parts by weight of water was added to a mixing vessel and 11.5 parts by weight of 87-89% hydrolyzed polyvinyl alcohol powder with a characteristic viscosity of 45-55 cP was added. The mixture was heated to 85 degrees C. for sixty minutes to produce a solution of polyvinyl alcohol. From this solution 1.0% bwoc of the polyvinyl alcohol was mixed with 0.5% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 190 degrees F. and a pressure of 1000 psig for 30 minutes and the slurry was checked for plastic viscosity and yield point. The slurry exhibited an API Fluid Loss of 23 mL/30 minutes. The plastic viscosity was 140 cP and the yield point was 2 lb/100 sq.ft.

Example 9

A quantity of 87.6 parts by weight of water was added to a mixing vessel and 12.4 parts by weight of 95.5-96.5% hydrolyzed polyvinyl alcohol powder with a characteristic viscosity of 27-31 cP was added. The mixture was heated to 93 degrees C. for sixty minutes to produce a solution of polyvinyl alcohol. From this solution 1.0% bwoc of the polyvinyl alcohol was mixed with 0.5% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 110 degrees F. and a pressure of 1000 psig for 30 minutes and the slurry was checked for plastic viscosity and yield point. The slurry exhibited an API Fluid Loss of 13 mL/30 minutes. The plastic viscosity was 198 cP and the yield point was −3 lb/100 sq.ft.

Example 10

A quantity of 87.6 parts by weight of water was added to a mixing vessel and 12.4 parts by weight of 95.5-96.5% hydrolyzed polyvinyl alcohol powder with a characteristic viscosity of 27-31 cP was added. The mixture was heated to 93 degrees C. for sixty minutes to produce a solution of polyvinyl alcohol. From this solution 1.0% bwoc of the polyvinyl alcohol was mixed with 0.5% bwoc dispersant powder and water with the balance cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 190 degrees F. and a pressure of 1000 psig for 30 minutes and the slurry was checked for plastic viscosity and yield point. The slurry exhibited an API Fluid Loss of 28 mL/30 minutes. The plastic viscosity was 141 cP and the yield point was −1 lb/100 sq.ft.

The results for examples 5-10, are summarized in Table 3, below.

TABLE 3

| | Examples 5-10 | | | | | | | |
|---|---|---|---|---|---|---|---|---|
| Example | Hydrolyzation PVOH (%) | Characteristic Viscosity PVOH | PVOH (% bwoc) | Dispersant (% bwoc) | Test temp. (° F.) | Plastic Viscosity (cps) | Yield Point (lb/100 sqft) | API Fluid Loss (ml/30 min) |
| 5 | 87-89 | 5.2-6.2 | 1 | 0.5 | 110 | 81 | −2 | 13 |
| 6 | 87-89 | 45-55 | 1 | 0.5 | 110 | 246 | 6 | 14 |
| 7 | 87-89 | 5.2-6.2 | 1 | 0.5 | 190 | 66 | 0 | 64 |
| 8 | 87-89 | 45-55 | 1 | 0.5 | 190 | 140 | 2 | 23 |
| 9 | 95.5-96.5 | 27-31 | 1 | 0.5 | 110 | 198 | −3 | 13 |
| 10 | 95.5-96.5 | 27-31 | 1 | 0.5 | 190 | 141 | −1 | 28 |

As can be seen from Table 3, lower molecular weight PVOH resins have comparable values of API fluid loss at 110° F. (13 ml/30 minutes), while at the same time, imparting a lower plastic viscosity to the slurry as compared to higher molecular weight resins. This is an unexpected and highly useful result since the art teaches that very high viscosity PVOH resins should be used as fluid loss additives. It can be seen, however, that at elevated temperatures, i.e., 190° F., the low molecular weight PVOH begins to lose its fluid loss efficacy.

Examples 11-18

Another series of aqueous cement slurries were prepared and tested using Celvol® 205S resin (characteristic viscosity of 5.2-6.2) and Lomar® D dispersant. Here, the aqueous cement slurries also had an initial density of about 16.4 lbs/gallon; however, dispersant use was varied. Results appear in Table 4 below.

TABLE 4

Examples 11-18

| Example | Temp (° F.) | Density (lb/gal) | PVOH (% bwoc) | Dispersant (% bwoc) | Fluid Loss (ml/min) | Fluid Loss API (ml/30 min) |
|---|---|---|---|---|---|---|
| 11 | 110 | 16.2 | 0.8 | — | 35/0.2 | 882 (calc) |
| 12 | 110 | 16.2 | 0.8 | 0.50 | 20/30 | 40 |
| 13 | 190 | 16.4 | 1.3 | 0.50 | 48/3 | 304 (calc) |
| 14 | 190 | 16.4 | 1.0 | 0.63 | 48/15 | 136 (calc) |
| 15 | 190 | 16.4 | 1.2 | 0.76 | 33/30 | 66 |
| 16 | 260 | 16.2 | 0.8 | — | 88/1 | 964 |
| 17 | 260 | 16.2 | 0.8 | 0.50 | 91/11 | 301 |
| 18 | 260 | 16.4 | 1.5 | 0.94 | 90.30 | 180 |

Here again, it appears that PVOH with a characteristic viscosity of 5-6 appears to permit high levels of fluid loss at 190° F.

In the following examples a series of aqueous cement slurries were prepared with an NNDMA/AMPS polymer and Lomar® D dispersant. The amount of NNDMA/AMPS was varied. No PVOH resin was added to the slurry. The slurries were tested for rheological and fluid loss properties at 110° F. and 170° F. The results are shown in Table 5, below.

tive by itself, exhibiting API fluid loss values of over 200. Indeed, the amount of fluid loss appears to increase as more NNDMA/AMPS copolymer is added.

Examples 23-46

A designed experiment varying the quantity of 87-89% hydrolyzed polyvinyl alcohol with a characteristic viscosity of 5.2-6.2 cP, the quantity of dispersant powder, and the quantity of an NNDMA/AMPS copolymer combined with Class H cement powder and water was conducted in order to identify a cement slurry with optimized API fluid loss, rheology, and free water performance. The NNDMA/AMPS copolymer is believed to have a composition of about 80 wt. % AMPS units and 20 wt. % NNDMA units. Slurries were prepared according to API standards and tested in the HTHP fluid loss cell at a temperature of 190 degrees F. and a pressure of 1000 psig for 30 minutes. The slurry in each example had a density of 16.2 ppg. Slurries were also checked for plastic

TABLE 5

Examples 19-22

| Example | Temp (° F.) | Density (lb/gal) | NNDMA/AMPS (% bwoc) | Dispersant (% bwoc) | Fluid Loss (ml/min) | Plastic Viscosity (cps) | Yield Point (lb/100 sq. feet) | Free Water (%) | Calculated API Fluid Loss (ml/30 min) |
|---|---|---|---|---|---|---|---|---|---|
| 19 | 110 | 16.2 | 0.22 | 1.25 | 60/10 | 93 | 4 | 2.4 | 219 |
| 20 | 170 | 16.2 | 0.22 | 1.25 | 59/10 | 63 | 3 | 2.4 | 215 |
| 21 | 110 | 16.2 | 0.4 | 1.25 | 57/5 | 123 | 7 | 1.6 | 236 |
| 22 | 170 | 16.2 | 0.4 | 1.25 | 59/10 | 90 | 4 | 1.6 | 244 |

It is evident from Examples 19-22 that the NNDMA/AMPS copolymer does not act as an effective fluid loss addiviscosity, yield point, and free water. The results are shown in the following table.

TABLE 6

Examples 23-46

| Example | PVOH (% bwoc) | NNDMA/AMPS (% bwoc) | Dispersant (% bwoc) | Test Temperature (° F.) | Plastic Viscosity (cps) | Yield Point (lb/100 sq.ft) | Free Water (%) | API Fluid Loss (ml/30 min) |
|---|---|---|---|---|---|---|---|---|
| 23 | 1.5 | 0.3 | 1.5 | 110 | 254 | 14 | | 8 |
| 24 | 0.5 | 0.3 | 0.5 | 110 | 111 | 9 | | 546 |
| 25 | 1.5 | 0.15 | 0.5 | 110 | 164 | 7 | | 12 |
| 26 | 0.5 | 0.15 | 1.5 | 110 | 86 | 2 | | 10 |
| 27 | 1.5 | 0.15 | 1.5 | 110 | 185 | 8 | | 8 |
| 28 | 0.5 | 0.15 | 0.5 | 110 | 89 | 4 | | 207 |
| 29 | 1.5 | 0.15 | 1.5 | 190 | 108 | 0 | 8 | 19 |
| 30 | 1.5 | 0.2 | 1.25 | 110 | 216 | 6 | | 9 |
| 31 | 1.5 | 0.2 | 1.25 | 190 | 111 | 2 | | 20 |
| 32 | 1.5 | 0.1 | 1.25 | 190 | 86 | 2 | | 23 |
| 33 | 1.5 | 0.1 | 1.25 | 190 | 78 | 2 | | 22 |
| 34 | 1.5 | 0.1 | 1.25 | 190 | 87 | 0 | | 18 |
| 35 | 1.5 | 0.2 | 1.25 | 190 | 63 | 3 | | 25 |
| 36 | 1.5 | 0.3 | 0.5 | 110 | 215 | 12 | | 16 |
| 37 | 0.5 | 0.3 | 1.5 | 110 | 122 | 6 | | 15 |

TABLE 6-continued

Examples 23-46

| Example | PVOH (% bwoc) | NNDMA/ AMPS (% bwoc) | Dispersant (% bwoc) | Test Temperature (° F.) | Plastic Viscosity (cps) | Yield Point (lb/100 sq.ft) | Free Water (%) | API Fluid Loss (ml/30 min) |
|---|---|---|---|---|---|---|---|---|
| 38 | 1.5 | 0.15 | 1.5 | 190 | 84 | 1 | | 16 |
| 39 | 1 | 0.22 | 1 | 110 | 137 | 11 | | 9 |
| 40 | 1.25 | 0.5 | 1.25 | 190 | 162 | 9 | 11.2 | 20 |
| 41 | 1.25 | 0.22 | 1.25 | 190 | 98 | 3 | | 23 |
| 42 | 1 | 0.5 | 1 | 190 | 89 | 4 | | 22 |
| 43 | 1.25 | 0.22 | 1.25 | 150 | 113 | 6 | 1.2 | 12 |
| 44 | 1.25 | 0.22 | 1.25 | 150 | 80 | 2 | | 15 |
| 45 | 0.536 | 0.094 | 1.25 | 170 | 71 | 3 | | 28 |
| 46 | 0.459 | 0.08 | 1.25 | 170 | 68 | 2 | | 28 |

As will be appreciated from the foregoing data, the combination of AMPS copolymer with low molecular PVOH resin as a fluid loss composition produces slurries which exhibit reduced fluid loss, enabling more controllable set times for cement slurries in down hole applications due to the reduced fluid loss, even at high temperatures.

From these examples it was determined that a cement slurry containing, as an additive, 1) about 0.5-2% bwoc polyvinyl alcohol with a characteristic viscosity of 5.2-6.2 cP; and 2) about 0.1-0.5% bwoc of an NNDMA/AMPS copolymer, provides for a good combination of properties across a broad temperature range (110-190° F.). An especially preferred additive composition contains polyvinyl alcohol that is 87-89% hydrolyzed and has a characteristic viscosity of 5.2-6.2 cP, combined with an NNDMA/AMPS copolymer in a ratio of 1.25 parts PVOH to 0.22 parts AMPS copolymer.

It is seen from the following examples that the inventive aqueous concentrates are stable under aging conditions. The cement slurries in example 46-50 were prepared at various concentrations and were exposed to various temperatures over time.

Examples 47-51

Example 47

A quantity of 80.2 parts by weight of water was added to a mixing vessel and 19.8 parts by weight of 87-89% hydrolyzed polyvinyl alcohol with a characteristic viscosity of 5.2-6.2 cP mixed with NNDMA/AMPS at a ratio of 1.25 parts polyvinyl alcohol to 0.22 parts NNDMA/AMPS was added. The mixture was heated to 85 degrees C. for sixty minutes to produce a solution of polyvinyl alcohol. The solution was aged at 70 degrees F. for one week. After aging, the solution viscosity was 1720 cP. From this solution 0.71 gal/sk of polymer mixture was mixed with 1.25% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 170 degrees F. and a pressure of 1000 psig for 30 minutes and the slurry was checked for plastic viscosity and yield point. The slurry exhibited an API Fluid Loss of 26 mL/30 minutes. The plastic viscosity at 80 degrees F. was 203 cP and the yield point at 170 degrees F. was 3 lb/100 sq.ft. The free water was 2.8%.

Example 48

A quantity of 80.2 parts by weight of water was added to a mixing vessel and 19.8 parts by weight of 87-89% hydrolyzed polyvinyl alcohol with a characteristic viscosity of 5.2-6.2 cP mixed with NNDMA/AMPS at a ratio of 1.25 parts polyvinyl alcohol to 0.22 parts NNDMA/AMPS was added. The mixture was heated to 85 degrees C. for sixty minutes to produce a solution of polyvinyl alcohol. The solution was aged at 115 F for one week. After aging, the solution viscosity was 1660 cP. From this solution 0.71 gal/sk of polymer mixture was mixed with 1.25% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 170 degrees F. and a pressure of 1000 psig for 30 minutes and the slurry was checked for plastic viscosity and yield point. The slurry exhibited an API Fluid Loss of 21 mL/30 minutes. The plastic viscosity at 80 degrees F. was 227 cP and the yield point at 170 degrees F. was 4 lb/100 sq.ft. The free water was 2.4%.

Example 49

A quantity of 75.1 parts by weight of water was added to a mixing vessel and 24.9 parts by weight of 87-89% hydrolyzed polyvinyl alcohol with a characteristic viscosity of 5.2-6.2 cP mixed with NNDMA/AMPS at a ratio of 1.25 parts polyvinyl alcohol to 0.22 parts NNDMA/AMPS was added. The mixture was heated to 85 degrees C. for sixty minutes to produce a solution of polyvinyl alcohol. The solution was aged at 70 degrees F. for one week. After aging, the solution viscosity was 6392 cP. From this solution 0.57 gal/sk of polymer mixture was mixed with 1.25% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 170 degrees F. and a pressure of 1000 psig for 30 minutes and the slurry was checked for plastic viscosity and yield point. The slurry exhibited an API Fluid Loss of 26 mL/30 minutes. The plastic viscosity at 80 degrees F. was 203 cP and the yield point at 170 degrees F. was 3 lb/100 sq.ft. The free water was 2.8%.

Example 50

A quantity of 75.1 parts by weight of water was added to a mixing vessel and 24.9 parts by weight of 87-89% hydrolyzed polyvinyl alcohol with a characteristic viscosity of 5.2-6.2 cP mixed with NNDMA/AMPS at a ratio of 1.25 parts polyvinyl alcohol to 0.22 parts NNDMA/AMPS was added. The mixture was heated to 85 degrees C. for sixty minutes to produce a solution of polyvinyl alcohol. The solution was aged at 115 F for one week. After aging, the solution viscosity was 6392 cP. From this solution 0.57 gal/sk of polymer mixture was mixed with 1.25% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 170 degrees F. and a pressure of 1000 psig for 30 minutes and the slurry was checked for plastic viscosity and yield point. The slurry exhibited an API Fluid Loss of 21 mL/30 minutes. The plastic viscosity at 80 degrees F. was 264 cP and the yield point at 170 degrees F. was 3 lb/100 sq.ft. The free water was 3.2%.

Example 51

A quantity of 80.2 parts by weight of water was added to a mixing vessel and 19.8 parts by weight of 87-89% hydrolyzed polyvinyl alcohol with a characteristic viscosity of 5.2-6.2 cP mixed with NNDMA/AMPS at a ratio of 1.25 parts polyvinyl alcohol to 0.22 parts NNDMA/AMPS was added. The mixture was heated to 85 degrees C. for sixty minutes to produce a solution of polyvinyl alcohol. The solution was aged at 115 F for two weeks. From this solution 0.71 gal/sk of polymer mixture was mixed with 1.25% bwoc dispersant powder and water with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 170 degrees F. and a pressure of 1000 psig for 30 minutes and the slurry was checked for plastic viscosity and yield point. The slurry exhibited an API Fluid Loss of 21 mL/30 minutes. The plastic viscosity at 80 degrees F. was 228 cP and the yield point at 170 degrees F. was 4 lb/100 sq.ft. The free water was 3.2%.

The results for the Examples 47-51 are shown in Table 7 below at a test temperature of 170° F.

A comparison of Examples 47-51 shows that the inventive fluid loss additive composition is stable upon aging. These examples also illustrate that the inventive aqueous concentrates achieve relatively low viscosities at high concentrations while still achieving superior fluid loss reduction.

It is seen from the following example that the concentrated solution of fluid loss polymer is advantageously utilized in connection with cement formulations which are slurried with seawater.

Example 52

Seawater

A quantity of 81.1 parts by weight of water was added to a mixing vessel an 19.8 parts by weight of 87-89% hydrolyzed polyvinyl alcohol with a characteristic viscosity of 5.2-6.2 cP was added. The mixture was heated to 85 degrees C. for sixty minutes to produce a solution of polyvinyl alcohol. From this solution 0.75% gal/sk of solution was mixed with 0.22% bwoc NNDMA/AMPS powder, 1.25% bwoc dispersant and seawater with the balance Class H cement to produce a cement slurry with a density of 16.2 pounds per gallon (ppg). The cement slurry was conditioned per American Petroleum Institute (API) standards for 20 minutes and placed in an HTHP Fluid Loss Cell. Fluid loss was measured at a temperature of 170 degrees F. and a pressure of 1000 psig for 30 minutes. The slurry was checked for plastic viscosity, yield point, and free water. The slurry exhibited an API Fluid Loss of 17 mL/30 minutes. The plastic viscosity at 170 degrees F. was 123 cP, the yield point was 4 lb/100 sq.ft., and the free water was 1.2%. This data shows that the inventive fluid loss additive composition is compatible with seawater slurries, as is commonly used in off-shore drilling.

Examples 53 and 54

Two cement slurries were prepared and tested for rheological, fluid loss, and set time properties. The test conditions are designed to emulate well conditions.

The following materials were used in Examples 53-54:

Fluid Loss Concentrate: Aqueous concentrate with a solids content of 17.69% and a weight ratio of PVOH resin to NNDMA/AMPS resin of 1.25:0.22

Cement: Class H Cement, available from Texas LeHigh (Buda, Tex.)

Dispersant: Daxad 19, available from Hampshire Chemical Corp. (Nashua, N.H.)

TABLE 7

| Ex. | Polymer in solution (wt. %) | Aging Time (weeks) | Aging Temp. (° F.) | Solution viscosity after aging (cps) | PVOH (% bwoc) | NNDMA/ AMPS (% bwoc) | Dispersant (% bwoc) | Plastic viscosity (cps) | Yield Point (lb/100 sq.ft) | Free water (%) | API Fluid Loss (ml/30 min) |
|---|---|---|---|---|---|---|---|---|---|---|---|
| 47 | 19.8 | 1 | 70 | 1720 | 1.063 | 0.187 | 1.25 | 86 | 3 | 2.8 | 26 |
| 48 | 19.8 | 1 | 115 | 1660 | 1.063 | 0.187 | 1.25 | 107 | 4 | 2.4 | 21 |
| 49 | 24.9 | 1 | 70 | 6392 | 1.063 | 0.187 | 1.25 | 86 | 3 | 2.8 | 26 |
| 50 | 24.9 | 1 | 115 | 6392 | 1.063 | 0.187 | 1.25 | 114 | 3 | 3.2 | 21 |
| 51 | 19.8 | 2 | 115 | — | 1.063 | 0.187 | 1.25 | 110 | 4 | 3.2 | 21 |

Retarder: Kelig 32 (50% solution), available from Borregaard LignoTech (Rothschild, Wis.)

Extender: Sodium Meta-Silicate
Defoamer: FP-6L, available from BJ Services Company (Houston, Tex.)

The examples were prepared according to the following formulations:

Example 53

Class H Cement+0.86 gal/sk Fluid Loss Concentrate+0.625% bwoc dispersant+0.02 gal/sk defoamer, mixed with 3.32 gal/sk Fresh Water or 4.2 gal/sk Total Mix Fluid at a density of 16.6 lb/gal and a yield of 1.05 cu-ft/sk

Example 54

Class H Cement+0.86 gal/sk Fluid Loss Concentrate+0.625% bwoc dispersant+0.02 gal/sk defoamer+0.01 gal/sk retarder+0.2% bwoc extender, mixed with 3.32 gal/sack fresh water or 4.21 gal/sk Total Mix Fluid at a density of 16.6 lb/gal and a yield of 1.05 cu-ft/sk Laboratory testing was conducted for two general well conditions. The conditions are as follows:

Conditions for Example 53: 13⅝-inch Intermediate Liner at a depth of 8,200 feet, with a Bottom Hole Static Temperature (BHST) of 145° F., a Bottom Hole Circulating Temperature (BHCT) of 120° F., and a Bottom Hole Pressure of 6,000 psi.

Conditions for Example 54: 9⅞-inch Drilling Liner at a depth of 11,500 feet, with a BHST of 197° F., a BHCT of 168° F., and a Bottom Hole Pressure of 9,500 psi.

The free water and fluid loss tests were performed after conditioning the slurry at BHCT for 20-minutes on an atmospheric consistometer. The free water tests were conducted at BHCT for 2-hours. The fluid loss tests were conducted at the BHCT and a pressure of 1000 psi. The fluid loss, free water, and rheological properties are listed for each example in tables 8 and 9, below.

TABLE 8

Rheology and Fluid Loss Data for Example 53

| Example | Test Temperature (° F.) | Plastic Viscosity (cps) | Yield Point (lb/100 sq.ft) | Free Water (%) | Fluid Loss (ml/30 min) |
|---|---|---|---|---|---|
| 53 | 80 | 315 | 25 | — | — |
|  | 120 | 225 | 5 | 1.6 | 22 |

TABLE 9

Rheology and Fluid Loss Data for Example 54

| Example | Test Temperature (° F.) | Plastic Viscosity (cps) | Yield Point (lb/100 sq.ft) | Free Water (%) | API Fluid Loss (ml/30 min) |
|---|---|---|---|---|---|
| 54 | 80 | 282 | 18 | — | — |
|  | 168 | 138 | 1 | 1.6 | 85 |

Examples 53 and 54 were also tested for thickening time, compressive strength and static gel strength.

The thickening time conditions for Example 53 are listed in Table 10, below.

TABLE 10

| Condition | Time (min) | Pressure (psi) | Temperature (° F.) |
|---|---|---|---|
| Initial | 0 | 760 | 80 |
| Final | 37 | 6000 | 120 |

Figure 3:
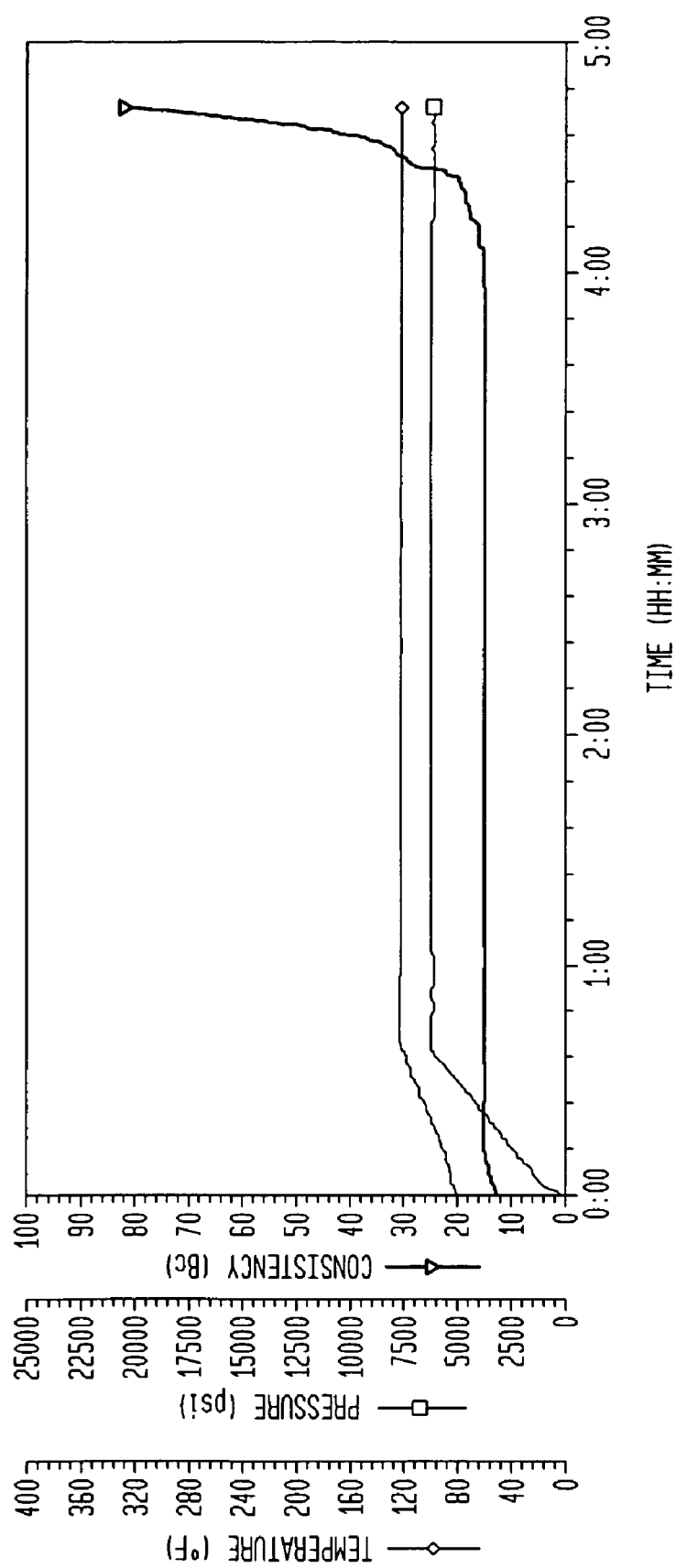
FIG. 3 is a plot of the consistency of the slurry in Example 53 versus time.

The thickening time for Example 53 was 4 hours and 42 minutes to 70 Bc. The thickening behavior of Example 53 is illustrated in FIG. 3.

Figure 4:
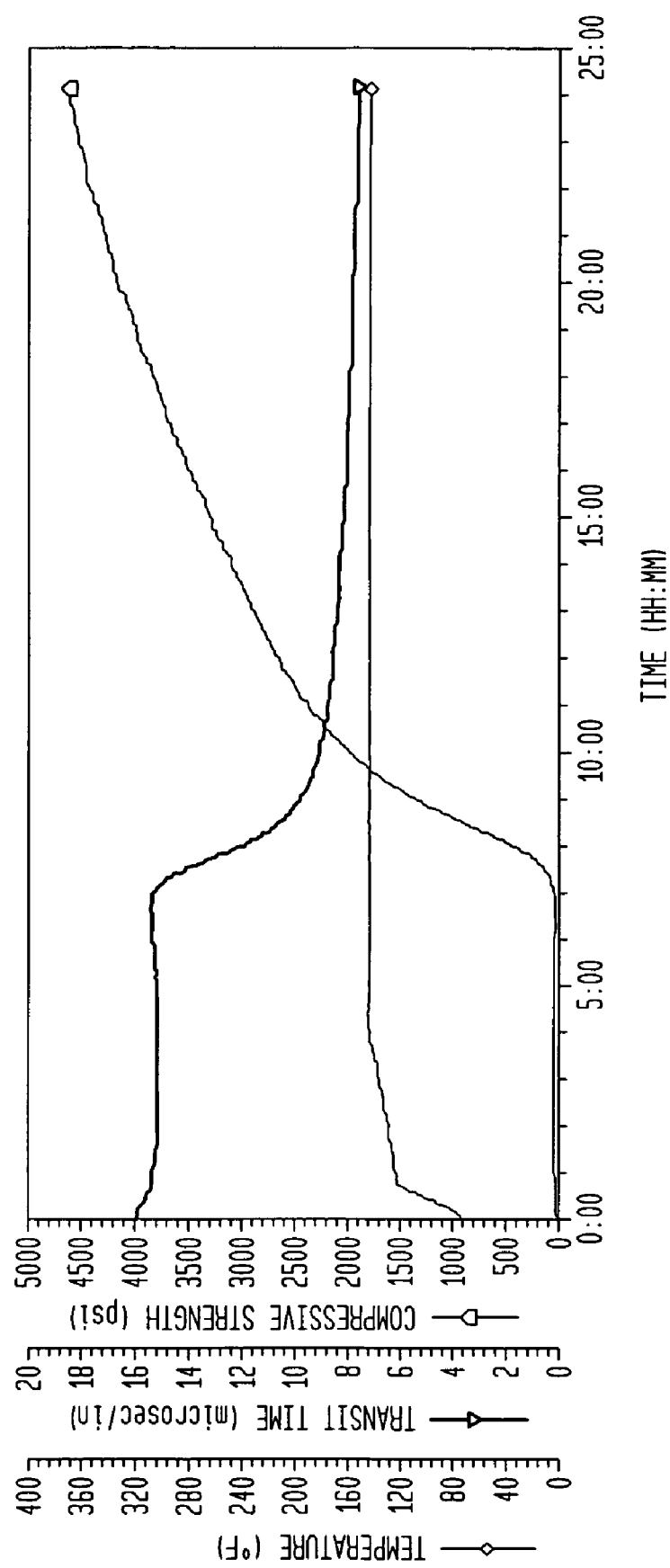
FIG. 4 illustrates the compressive strength of the cement in Example 53 over time.

The compressive strength properties of Example 53 are illustrated in Table 11, below, and is shown graphically in FIG. 4.

TABLE 11

Compressive Strength of Example 53

| Compressive Strength (psi) | Time (hrs:min) |
|---|---|
| 50 | 7:10 |
| 500 | 8:06 |
| 2646 | 12:00 |
| 4604 | 24:00 |

The static gel strength results for example 53 are seen in Table 12, below.

TABLE 12

Static Gel Strength of Example 53

| Static Gel Strength (lb/100 sq. ft.) | Time (hr:min) |
|---|---|
| 75 | 5:29 |
| 100 | 5:44 |
| 250 | 6:06 |
| 500 | 6:24 |
| 750 | 6:32 |
| 1000 | 6:38 |
| 1200 | 6:42 |

The slurry of Example 54 was tested for thickening time under the following temperature and pressure conditions:

TABLE 13

| Condition | Time (min) | Pressure (psi) | Temperature (° F.) |
|---|---|---|---|
| Initial | 0 | 1000 | 80 |
| Final | 48 | 9500 | 168 |

Figure 5:
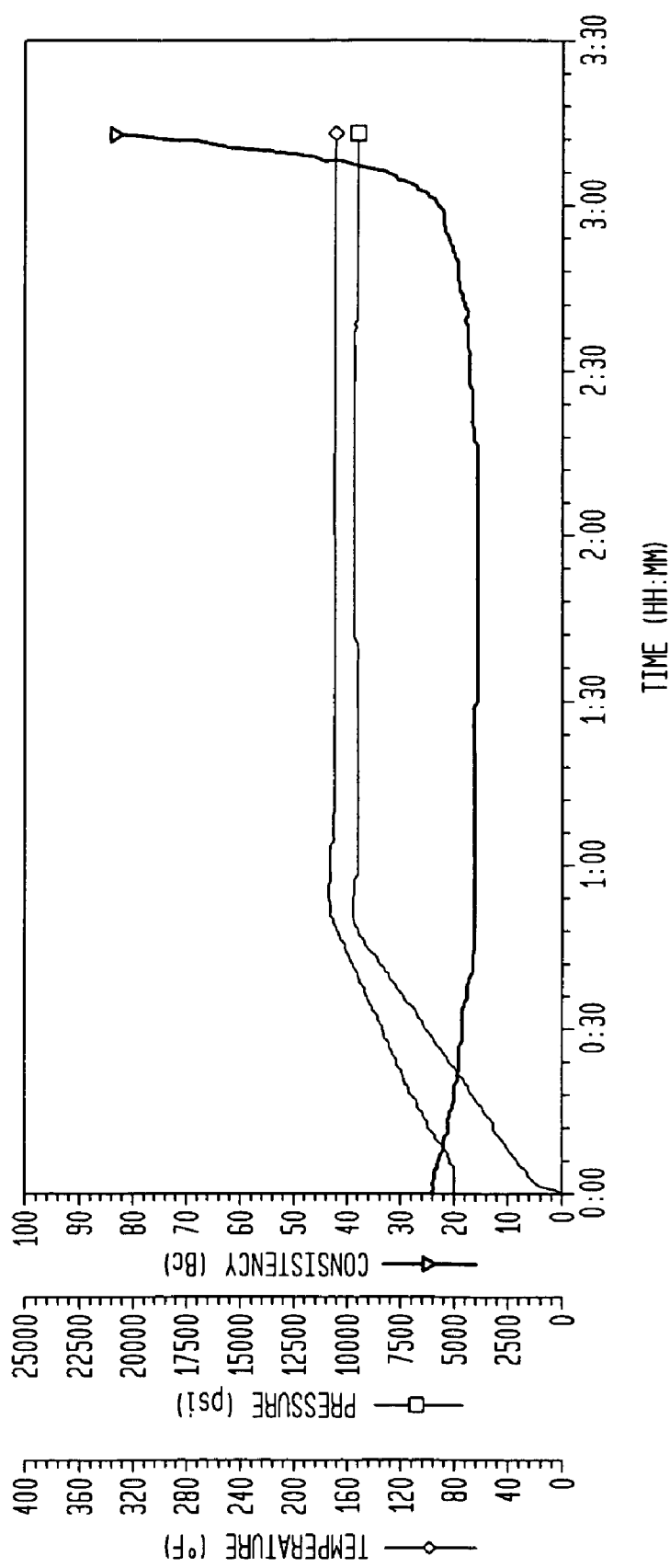
FIG. 5 is a plot of the consistency of the slurry in Example 54 versus time.

The thickening time for Example 54 was 3 hours and 12 minutes to 70 Bc. The thickening properties of Example 54 are illustrated in FIG. 5.

The compressive strength properties of Example 54 are shown in the table below. The compressive strength data is also shown graphically in FIG. 6.

TABLE 14

Compressive Strength of Example 54

| Compressive Strength (psi) | Time (hrs:min) |
|---|---|
| 50 | 9:01 |
| 500 | 10:12 |

TABLE 14-continued

Compressive Strength of Example 54

| Compressive Strength (psi) | Time (hrs:min) |
|---|---|
| 1234 | 12:00 |
| 2918 | 24:00 |

The static gel strength results for example 54 are seen in Table 15, below.

TABLE 15

Static Gel Strength of Example 54

| Static Gel Strength (lb/100 sq. ft.) | Time (hr:min) |
|---|---|
| 75 | 6:00 |
| 100 | 6:16 |
| 250 | 6:48 |
| 500 | 7:15 |
| 750 | 7:32 |
| 1000 | 7:46 |
| 1200 | 7:56 |

Figure 6:
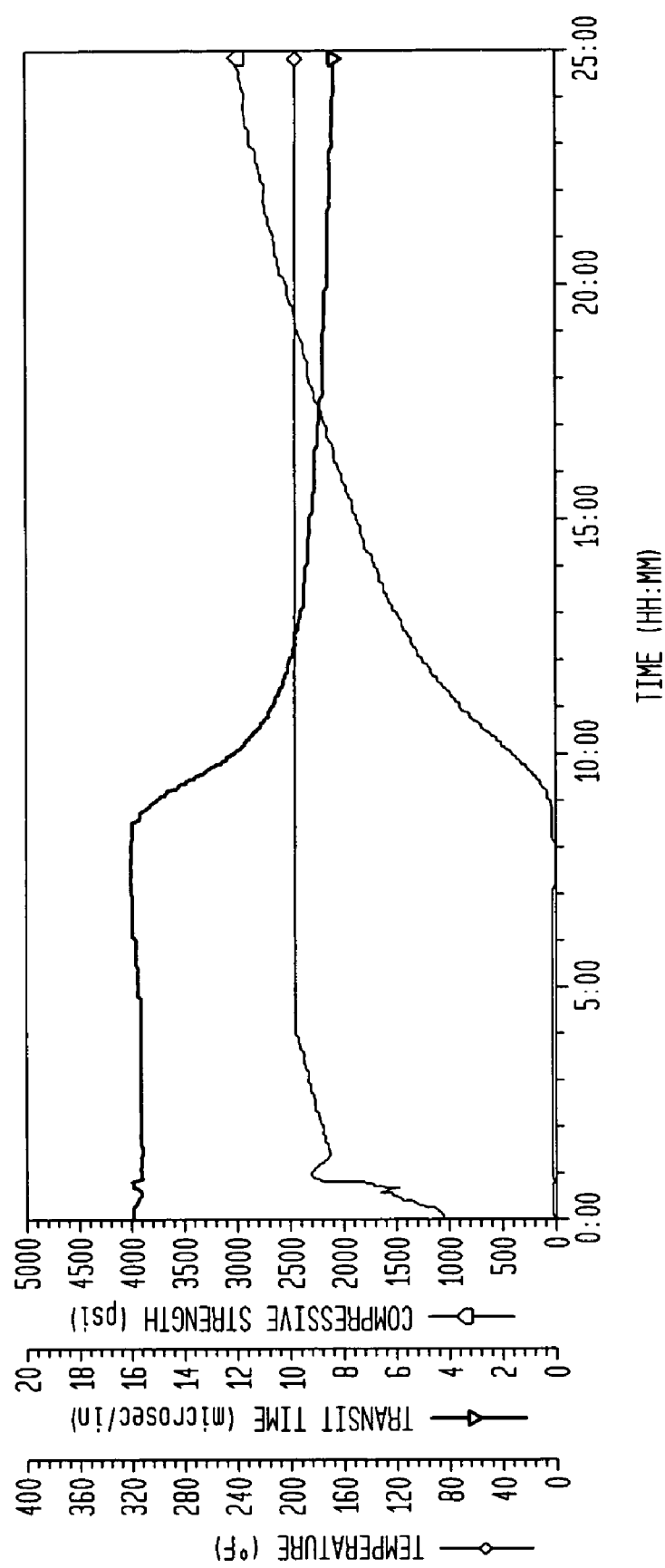
FIG. 6 illustrates the compressive strength of the cement in Example 54 over time.

It can be seen from the strength and thickening data that the cement has good setting characteristics. For example, FIGS. 3 and 5, illustrate that the thickening times of the inventive slurries are in a desirable range of about 3 to 5 hours. In the case of example 54, a retarder was added to the slurry to increase the thickening time at high temperatures. Additionally, FIGS. 4 and 6 illustrate the strength properties of the slurries. As can be seen from those figures, the inventive slurry solidifies relatively fast. The 500 psi mark (generally where the cement is considered strong enough to resume drilling activity) is achieved in about 8 hours for Example 52 and in about 10 hours for Example 54.

While the invention has been illustrated in connection with several examples, modifications to these examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. An aqueous concentrate for hydraulic cement to ameliorate fluid loss at elevated temperatures comprising a blend of:
    a) a polyvinyl alcohol resin having a characteristic viscosity in the range of from about 1 cps to about 25 cps; and
    b) a fluid loss ameliorating co-resin comprising a sulfonic acid-functionalized co-resin, wherein the sulfonic acid-functionalized co-resin is a copolymer which includes the residues of N,N-dimethylacrylamide (NNDMA) and AMPS, and wherein the copolymer comprises from about 60 to 99 weight percent AMPS monomer units and from about 1 to 40 weight percent NNDMA monomer units;
wherein further the blend is fully dissolved in the aqueous concentrate solution; and
wherein the total resin content of the concentrate solution is between about 10 and 40 percent by weight, the concentrate solution has a viscosity in the range of from about 10 cps to about 15,000 cps at 20° C., and wherein further the weight ratio of polyvinyl alcohol resin to sulfonic acid-functionalized co-resin is in the range of from about 2.5:1 to about 10:1 and the polyvinyl alcohol resin and the sulfonic acid-functionalized co-resin are selected such that the blend is synergistically effective to reduce API Fluid loss of a cement slurry at elevated temperatures as compared with either component of the blend, with the further proviso that the blend is effective to reduce the API fluid loss of a cement slurry by at least 50% at 170° F. as compared with a slurry with either the polyvinyl alcohol only instead of the blend or the AMPS/NNDMA resin only instead of the blend.

2. The concentrate of claim 1, wherein the sulfonic acid-functionalized co-resin comprises the residue of 2-acrylamido-2-methylpropyl sulfonic acid (AMPS).

3. The concentrate of claim 1, wherein the sulfonic acid-functionalized co-resin is a copolymer having predominantly monomer units with sulfonic acid groups.

4. The concentrate of claim 1, wherein the sulfonic acid-functionalized co-resin is a copolymer having predominantly AMPS monomer units.

5. The concentrate of claim 1, wherein the polyvinyl alcohol resin has a characteristic viscosity in the range of from about 2 cps to about 15 cps.

6. The concentrate of claim 1, wherein the polyvinyl alcohol resin has a characteristic viscosity in the range of from about 3 to about 10 cps.

7. The concentrate of claim 1, wherein the polyvinyl alcohol resin has a characteristic viscosity in the range of from about 5 cps to about 7 cps.

8. The concentrate of claim 1, wherein the polyvinyl alcohol resin is from about 80 percent to about 95 percent hydrolyzed based on polyvinyl acetate monomer content.

9. The concentrate of claim 1, wherein the polyvinyl alcohol resin is from about 84 percent to about 90 percent hydrolyzed based on polyvinyl acetate monomer content.

10. The concentrate of claim 1, wherein the polyvinyl alcohol resin is from about 87 percent to about 89 percent hydrolyzed based on polyvinyl acetate monomer content.

11. The concentrate of claim 1, wherein the polyvinyl alcohol resin is derived from polyvinyl acetate homopolymer.

12. The concentrate of claim 1, wherein the weight ratio of polyvinyl alcohol resin to sulfonic acid-functionalized co-resin is in the range of from about 3:1 to about 10:1.

13. The concentrate of claim 1, wherein the weight ratio of polyvinyl alcohol resin to sulfonic acid-functionalized co-resin is in the range of from about 4:1 to about 8:1.

14. The concentrate of claim 1, wherein the weight ratio of polyvinyl alcohol resin to sulfonic acid-functionalized co-resin is in the range of from about 5:1 to about 7:1.

15. The concentrate of claim 1, wherein the total resin content is in the range of from about 15 to about 30 weight percent.

16. The concentrate of claim 1, wherein the total resin content is in the range of from about 15 and 25 weight percent.

17. The concentrate of claim 1, wherein the viscosity of the concentrate solution is in the range of from about 100 cps to about 12,000 cps at 20° C.

18. The concentrate of claim 1, wherein the viscosity of the concentrate solution is in the range of from about 500 cps to about 10,000 cps at 20° C.

19. The concentrate of claim 1, wherein the viscosity of the concentrate solution is in the range of from about 1,000 cps to about 8,000 cps at 20° C.

20. The concentrate of claim 1, wherein the polyvinyl alcohol resin is provided to the aqueous concentrate in fine particulate form, wherein the particulate resin is of a size such that at least about 99% of the resin passes through an 80 mesh sieve.

21. An aqueous concentrate for hydraulic cement to ameliorate fluid loss at elevated temperatures comprising a blend of:

a) a polyvinyl alcohol resin having a characteristic viscosity in the range of from about 1 cps to about 25 cps; and b) a fluid loss ameliorating co-resin comprising a sulfonic acid-functionalized co-resin, wherein the sulfonic acid-functionalized co-resin is a copolymer which includes the residues of N,N-dimethylacrylamide (NNDMA) and AMPS, and wherein the copolymer comprises from about 60 to 99 weight percent AMPS monomer units and from about 1 to 40 weight percent NNDMA monomer units;

wherein further the blend is fully dissolved in the aqueous concentrate solution; and wherein the total resin content of the concentrate solution is between about 10 and 40 percent by weight, the concentrate solution has a viscosity in the range of from about 10 cps to about 15,000 cps at 20° C., and wherein further the weight ratio of polyvinyl alcohol resin to sulfonic acid-functionalized co-resin is in the range of from about 2.5:1 to about 10:1 and the polyvinyl alcohol resin and the sulfonic acid-functionalized co-resin are selected such that the blend is synergistically effective to reduce API Fluid loss of a cement slurry at elevated temperatures as compared with either component of the blend with the further proviso the blend is effective to impart an API fluid loss of less than about 50 ml/30 min at 170° F. and 1,000 psi to a standard seawater cement slurry when present therein in amounts of less than 1.5% by weight of cement.

* * * * *